(12) United States Patent  (10) Patent No.: US 7,795,849 B2
Sohma  (45) Date of Patent: Sep. 14, 2010

(54) SYNCHRONOUS RECTIFICATION SWITCHING REGULATOR, CONTROL CIRCUIT FOR SYNCHRONOUS RECTIFICATION SWITCHING REGULATOR, AND CONTROL METHOD FOR SYNCHRONOUS RECTIFICATION SWITCHING REGULATOR

(75) Inventor: Shohtaroh Sohma, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 423 days.

(21) Appl. No.: 11/905,048

(22) Filed: Sep. 27, 2007

(65) Prior Publication Data

US 2008/0080219 A1 Apr. 3, 2008

(30) Foreign Application Priority Data

Sep. 29, 2006 (JP) ............................. 2006-268325

(51) Int. Cl.
  *G05F 1/59* (2006.01)
(52) U.S. Cl. .................... 323/271; 323/222; 323/285
(58) Field of Classification Search ................ 323/222, 323/271, 282, 285
  See application file for complete search history.

(56) References Cited

U.S. PATENT DOCUMENTS

| 5,808,455 | A  | * | 9/1998  | Schwartz et al. ............ 323/271 |
| 5,912,552 | A  |   | 6/1999  | Tateishi |
| 6,707,281 | B2 | * | 3/2004  | Solivan ...................... 323/225 |
| 7,135,844 | B2 | * | 11/2006 | Hane et al. ................... 323/283 |
| 7,166,993 | B2 | * | 1/2007  | Shimizu et al. ............. 323/282 |
| 7,170,267 | B1 | * | 1/2007  | McJimsey .................... 323/271 |
| 7,245,113 | B2 | * | 7/2007  | Chen et al. ................... 323/271 |
| 7,327,127 | B2 | * | 2/2008  | Ho ............................. 323/271 |
| 7,498,785 | B2 | * | 3/2009  | Shimizu et al. ............. 323/282 |
| 7,598,715 | B1 | * | 10/2009 | Hariman et al. ............. 323/271 |
| 7,652,945 | B2 | * | 1/2010  | Chu et al. .................... 365/226 |
| 2004/0196096 | A1 |  | 10/2004 | Kondo et al. |
| 2008/0088283 | A1 | * | 4/2008 | Ruobiao et al. ............. 323/271 |

FOREIGN PATENT DOCUMENTS

| JP | 10-225105 A | 8/1998 |
| JP | 2005-253253 A | 9/2005 |
| JP | 2005-341789 | 12/2005 |
| KR | 10-2004-0086803 A | 10/2004 |

* cited by examiner

*Primary Examiner*—Jeffrey L Sterrett
(74) *Attorney, Agent, or Firm*—Dickstein Shapiro LLP

(57) ABSTRACT

A control circuit for a synchronous rectification switching regulator including an output terminal, a switching transistor, an inductor, and a synchronous rectification transistor has a control part configured to control switching of the switching transistor to charge the inductor to and set a voltage output from the output terminal to a predetermined voltage, which causes the synchronous rectification transistor to switch reversely to the switching transistor and discharge the inductor, and backflow prevention part configured to block a current flowing in the synchronous rectification transistor to prevent a backflow current that flows in a direction from the output terminal to the synchronous rectification transistor. The backflow prevention part detects a forward current and regulates timing to block the current flowing in the synchronous rectification transistor and to regulate a time period from blocking the current flowing in the synchronous rectification transistor to determining that the forward current is zero.

20 Claims, 13 Drawing Sheets

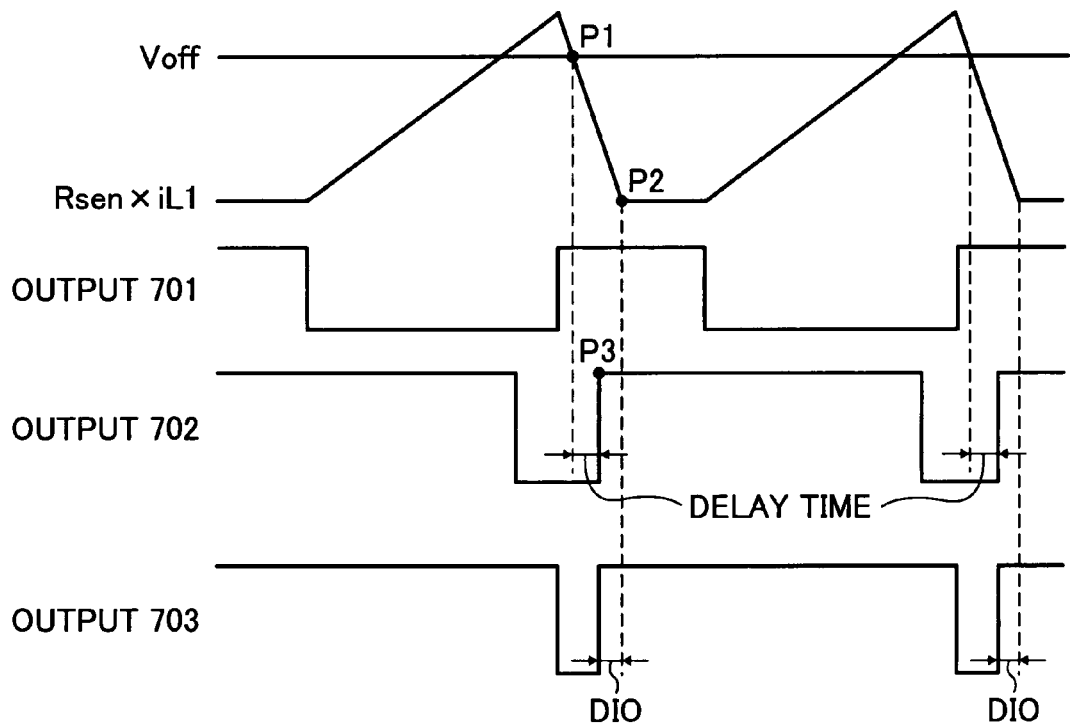
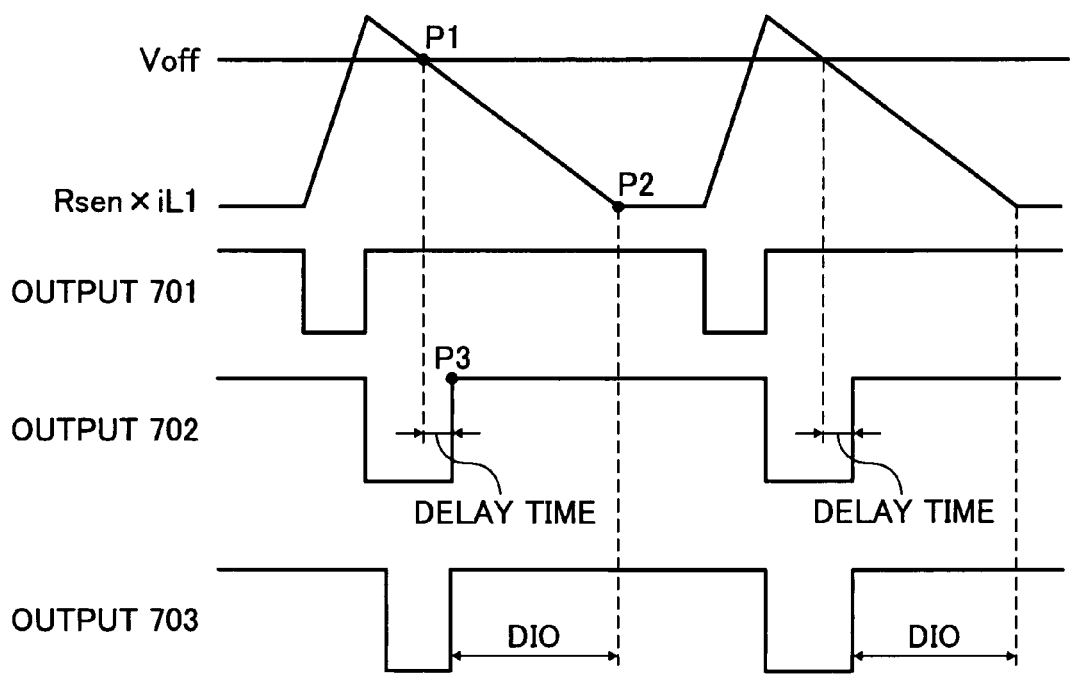

SYNCHRONOUS RECTIFICATION SWITCHING REGULATOR, CONTROL CIRCUIT FOR SYNCHRONOUS RECTIFICATION SWITCHING REGULATOR, AND CONTROL METHOD FOR SYNCHRONOUS RECTIFICATION SWITCHING REGULATOR

CROSS-REFERENCE TO RELATED APPLICATION

This application claims priority from Japanese Patent Application No. 2006-268325, filed on Sep. 29, 2006, the disclosure of which is hereby incorporated by reference in its entirety.

BACKGROUND OF THE INVENTION

1. Field of the Invention

The present invention relates generally to a synchronous rectification switching regulator, a control circuit for a synchronous rectification switching regulator, and a method of controlling the synchronous rectification switching regulator.

2. Discussion of the Background Art

In recent years, a need has arisen to extend battery life in electronic devices that use a battery for power supply (e.g., PDA or personal digital assistance, cellular phone, etc). Battery life may be extended by enhancing a power supply circuit as well as by reducing wasteful power consumption.

In such electronic devices, a non-insulated switching regulator using an inductor is commonly used as an efficient power supply circuit. A synchronous rectification switching regulator that can enhance efficiency by using a MOS (metal-oxide semiconductor) transistor instead of a diode is widely used because the diode may cause a forward voltage drop.

However, in the case of the synchronous rectification switching regulator, electric current tends to flow in reverse (backflow current) in the inductor from an output terminal when a load current therein is low, thus decreasing efficiency. For example, a cellular phone has a low load current in a standby mode.

To prevent a backflow of the current, it is necessary to detect the backflow of the current. One type of synchronous rectification switching regulator includes a voltage comparison circuit as illustrated in FIG. 1. The current flowing in the inductor is converted to a voltage. The voltage comparison circuit detects the backflow of the current by comparing the voltage with a reference voltage.

In FIG. 1, a switching regulator 200 includes a backflow detection circuit 700, a PWM (Pulse Width Modulation) control circuit 701, a backflow prevention transistor 704, an inductor 705, a switching transistor 706 that is a PMOS (P-channel metal oxide semiconductor) transistor, a synchronous rectification transistor 707 that is an NMOS (N-channel metal oxide semiconductor) transistor, a resistance 708 having a resistance value Rsen, connected in series with the inductor 705, and a load 710. The resistance 708 converts an inductor current iL1 into a voltage. A voltage difference between both ends of the resistance 708 is Rsen×iL1. The backflow detection circuit 700 includes a voltage comparison circuit 702 and a latch circuit 703. The PWM control circuit 701 controls switching of the switching transistor 706 and the synchronous rectification transistor 707 to regulate an output voltage Vout.

FIGS. 2 and 3 are timing charts illustrating example wave patterns of respective parts shown in FIG. 1 when the load current is low. FIG. 2 illustrates a state in which the output voltage Vout is higher and the inductor current iL1 has a larger decrease slope. In FIG. 3, the output voltage Vout is lower and the inductor current iL1 has a smaller decrease slope.

In FIGS. 2 and 3, the voltage comparison circuit 702 detects an indication that the backflow current is about to occur when the voltage difference between both ends of the resistance 708 becomes an offset voltage Voff at P1. Because the voltage comparison circuit 702 has a delay time, the offset voltage Voff is set to a reference value that takes into consideration the delay time as well as changes in resistance value of the resistance 708, not to a value at which the backflow actually occurs. When the indication is detected, a signal indicating the occurrence of the backflow is transmitted to the latch circuit 703 after the delay time. Receiving the signal, the latch circuit 703 turns off the backflow prevention transistor 704 at P3 to shut off a path for the backflow of the current. The backflow prevention transistor 704 remains shut off until the PWM control circuit 701 turns on the switching transistor 706.

The inductor current iL1 flows in a forward direction (forward current) through a parasite diode of the backflow prevention transistor 704 for a time period DIO, after the backflow prevention transistor 704 is turned off until the forward current stops at P2. In FIG. 3, the time period DIO is longer than in FIG. 2. Therefore, the electricity loss caused by the parasite diode is larger.

Another type of synchronous rectification switching regulator, a step-down switching regulator, detects timing when a voltage at a connection between a switching transistor and a synchronous rectification transistor rises above a ground voltage after the voltage falls below the ground voltage at high speed. The switching regulator turns off the synchronous rectification transistor to prevent a current from flowing in reverse when a load is low.

SUMMARY OF THE INVENTION

Various embodiments disclosed herein describe a control circuit for a synchronous rectification switching regulator that can enhance efficiency when a load current is small.

In one example embodiment, a control circuit for a synchronous rectification switching regulator including an output terminal, a switching transistor, an inductor, and a synchronous rectification transistor includes a control part and a backflow prevention part. The switching transistor performs switching according to a control signal to charge the inductor with an input voltage. The synchronous rectification transistor performs switching according to a control signal to discharge the inductor. The control part controls the switching of the switching transistor to set a constant voltage output from the output terminal to a predetermined voltage and causes the synchronous rectification transistor to switch reversely to the switching of the switching transistor. The backflow prevention part blocks a current flowing in the synchronous rectification transistor to prevent occurrence of a backflow current flowing in a direction from the output terminal to the synchronous rectification transistor. The backflow prevention part detects a forward current that flows when the synchronous rectification transistor discharges the inductor and regulate timing to block the current flowing in the synchronous rectification transistor so as to set a time period that extends from blocking the current flowing in the synchronous rectification transistor to determining that the forward current is zero to a predetermined time.

In another example embodiment, a synchronous rectification switching regulator includes an output terminal, a switching transistor, an inductor, a synchronous rectification transistor, a control part, and a backflow prevention part. The switching transistor performs switching according to a control signal to charge the inductor with an input voltage. The synchronous rectification transistor performs switching according to a control signal to discharge the inductor. The control part controls the switching of the switching transistor to set a constant voltage output from the output terminal to a predetermined voltage and causes the synchronous rectification transistor to switch reversely to the switching of the switching transistor. The backflow prevention part blocks a current flowing in the synchronous rectification transistor to prevent occurrence of a backflow current flowing in a direction from the output terminal to the synchronous rectification transistor. The backflow prevention part detects a forward current that flows when the synchronous rectification transistor discharges the inductor and regulates timing to block the current flowing in the synchronous rectification transistor so as to regulate a time period that extends from blocking the current flowing in the synchronous rectification transistor to determining that the forward current is zero.

In yet another example embodiment, a control method for a synchronous rectification switching regulator including an output terminal, a switching transistor, an inductor, and a synchronous rectification transistor includes controlling switching of the switching transistor to charge the inductor to set a constant voltage output from the output terminal to a predetermined voltage; causing the synchronous rectification transistor to switch reversely to the switching of the switching transistor so as to discharge the inductor; detecting a forward current that flows when the synchronous rectification transistor discharges the inductor; blocking a current flowing in the synchronous rectification transistor to prevent a backflow current; determining that the forward current is zero; and regulating timing to block the current flowing in the synchronous rectification transistor so as to regulate a time period that extends from blocking the current flowing in the synchronous rectification transistor to determining that the forward current is zero.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a timing chart illustrating wave patterns of respective parts in shown FIG. 1;

FIG. 3 is a timing chart illustrating wave patterns of respective parts shown in FIG. 1;

DETAILED DESCRIPTION OF PREFERRED EMBODIMENTS

Figure 1:
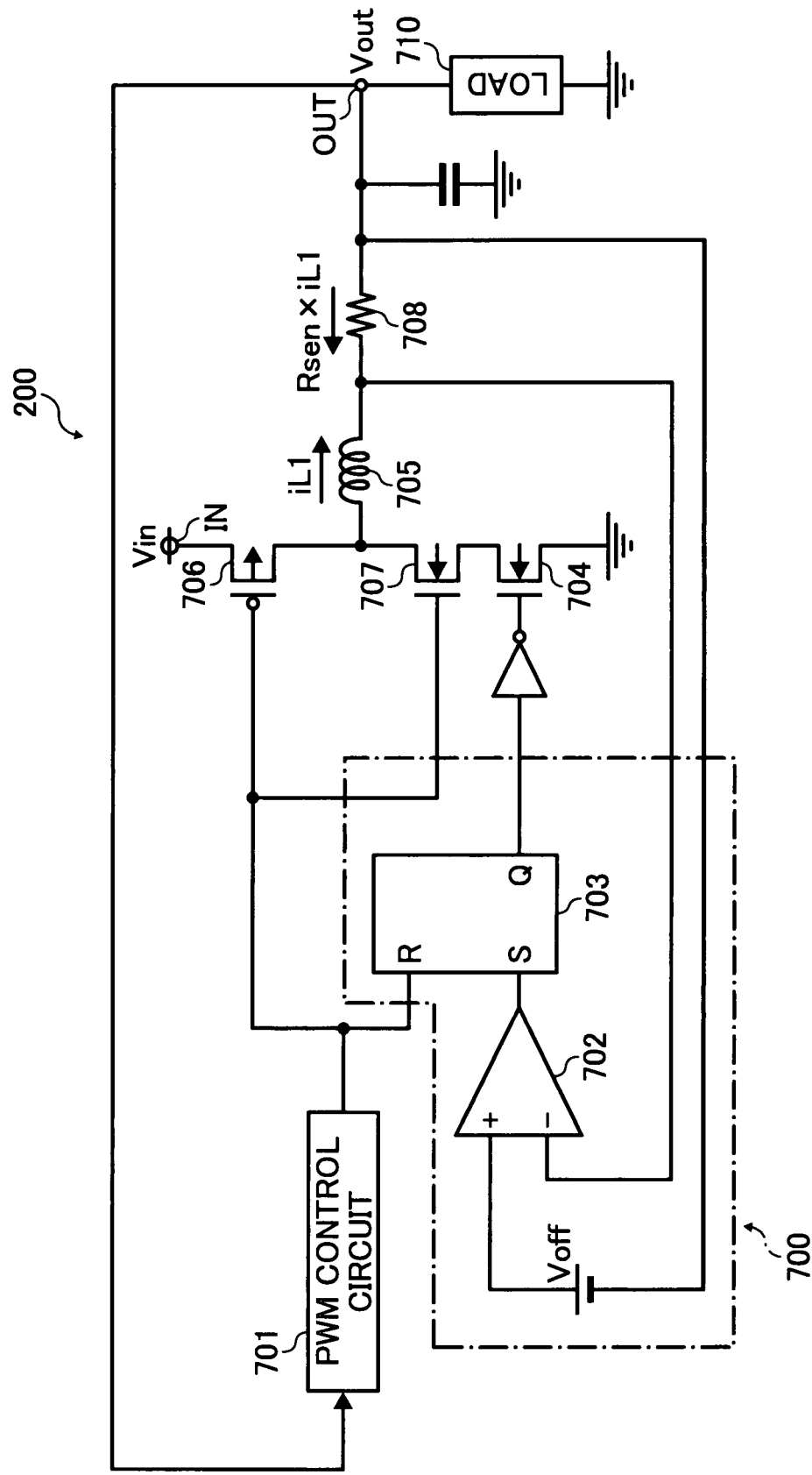
FIG. 1 illustrates an example of a configuration of a related-art switching regulator.

In describing example embodiments illustrated in the drawings, specific terminology is employed for the sake of clarity. However, the disclosure of this patent specification is not intended to be limited to the specific terminology so selected, and it is therefore to be understood that each specific element includes all technical equivalents that operate in a similar manner.

Figure 4:
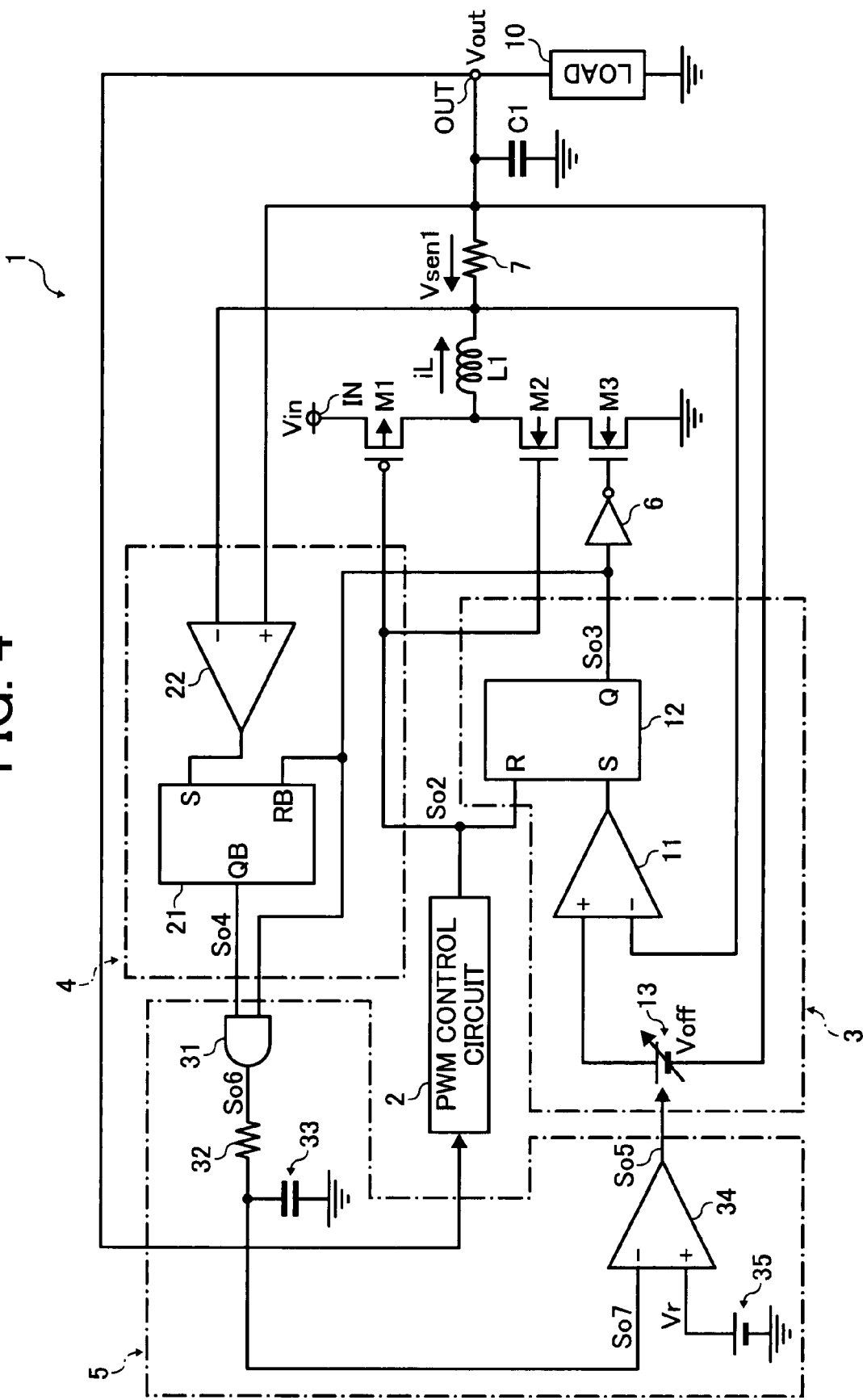
FIG. 4 illustrates a configuration example of a switching regulator according to an example embodiment.

Referring now to the drawings, wherein like reference numerals designate identical or corresponding parts throughout the several views, and particularly to FIG. 4, an example configuration of a switching regulator 1 according to an example embodiment of the present invention is described.

The switching regulator 1 steps down an input voltage Vin input to an input terminal IN to output a predetermined or desirable constant voltage as an output voltage Vout from an output terminal OUT to a load 10.

The switching regulator 1 includes a switching transistor M1 that is a PMOS transistor and a synchronous rectification transistor M2 that is an NMOS transistor, each configured to switch so as to control an output of the input voltage Vin.

The switching regulator 1 further includes a PWM control circuit 2 as a control part, a backflow detection circuit 3, a forward current detection circuit 4, a regulation circuit 5, an inverter 6, an NMOS transistor M3 as a backflow prevention transistor, a resistance 7, a capacitor C1, and an inductor L1.

The switching regulators 1 is configured to prevent or reduce backflow of an inductor current iL flowing in the inductor L1 and reduce a time period for the inductor current iL to flow through a parasite diode of the NMOS transistor M3 so as to reduce electricity loss and enhance efficiency. To detect a backflow of the inductor current iL, the inductor current iL is converted into a voltage (converted voltage iLV) with the resistance 7. The switching regulator 1 includes a voltage comparison circuit to compare the converted voltage iLV with a reference voltage so as to detect the backflow of the inductor current iL. The voltage comparison circuit includes a differential offset in addition to a delay time. The relation between the converted voltage iLV and the reference voltage may change depending on various factors including temperature, current-to-voltage conversion methods, etc. Therefore, the reference voltage may require an offset to prevent the backflow of the current.

The backflow detection circuit 3, the forward current detection circuit 4, the regulation circuit 5, the inverter 6, the NMOS transistor M3, and the resistance 7 function as a backflow prevention part. The backflow detection circuit 3 and the inverter 6 function as a backflow detection part. The forward current detection circuit 4 and the regulation circuit 5 function as a regulation part. The resistance 7 includes a first end at a side of the inductor L1 and a second end at a side of the capacitor C1.

The respective circuits in the switching regulator 1 excepting the inductor L1 and the capacitor C1 may be integrated in an IC (integrated circuit). Alternatively, at least one of the switching transistor M1 and the synchronous rectification transistor M2 and other circuits excepting the inductor L1 and the capacitor C1 may be integrated in an IC.

The switching transistor M1, the synchronous rectification transistor M2, and the NMOS transistor M3 are connected in series between the input terminal IN and a ground voltage. The inductor L1 and the resistance 7 are connected in series between the output terminal OUT and a connection between the switching transistor M1 and the synchronous rectification transistor M2. The capacitor C1 is connected between the output terminal OUT and a ground voltage.

The PWM control circuit 2 controls switching of the switching transistor M1 and the synchronous rectification transistor M2 by controlling pulse-width modulation thereof to set the output voltage Vout to a predetermined or desirable voltage.

The backflow detection circuit 3 detects the backflow of the inductor current (backflow current) based on the voltages at the first and second ends of the resistance 7 and turns off the NMOS transistor M3 to block a current flowing in the synchronous rectification transistor M2 when detecting an indication that the inductor current iL is about to flow in reverse (indication of the inductor backflow current).

The forward current detection circuit 4 detects, based on the voltages at the first and the second ends of the resistance 7, that a current flowing in a parasite diode of the NMOS transistor M3 is zero while the NMOS transistor M3 is off. The parasite diode of the NMOS transistor M3 is hereinafter referred to as the M3 parasite diode. The forward current detection circuit 4 outputs a signal So4 indicating a detection result thereof.

The regulation circuit 5 regulates a timing with which the backflow detection circuit 3 detects the inductor backflow current. The inductor current iL flows through the NMOS transistor M3 that is a path for the inductor backflow current, before starting to flow in reverse. If the backflow current detection is too early, electricity loss increases because the inductor current iL flows though the M3 parasite diode. Therefore, the regulation circuit 5 regulates the timing to reduce a time period between a control signal to turn off the NMOS transistor M3 and the signal So4 indicating that the current flowing through the M3 parasite diode is zero. A voltage difference between the first and the second ends of the resistance 7 is Rsen×iL when the resistance value thereof is Rsen Ω, and this voltage difference is hereinafter referred to as Vsen1.

The backflow detection circuit 3 includes a comparator 11, a latch circuit 12, and an offset voltage circuit 13 that generates an offset voltage Voff according to a signal input thereto. The comparator 11 and the offset voltage circuit 13 function as the voltage comparison circuit.

The comparator 11 includes a non-inverting input terminal, an inverting input terminal to which a voltage at a connection between the inductor L1 and the resistance 7 is input, and an output terminal. The offset voltage circuit 13 adds the offset voltage Voff to a voltage at a connection between the resistance 7 and the output terminal OUT and outputs the voltage to the non-inverting input terminal of the comparator 11.

The latch circuit 12 serves as a drive control circuit for controlling the switching of the NMOS transistor M3 and includes a set terminal S connected to the output terminal of the comparator circuit 11, a reset terminal R, and an output terminal Q that is connected to a gate of the NMOS transistor M3 via the inverter 6. The gate of the NMOS transistor M3 serves as a control electrode. The PWM control circuit 2 outputs a signal So2 to a gate of each of the switching transistor M1 and the synchronous rectification transistor M2. The signal So2 is also input to the reset terminal R of the latch circuit 12.

The forward current detection circuit 4 includes a latch circuit 21 and a comparator 22. The latch circuit 21 includes a reset terminal RB, a set terminal S, and an output terminal QB. The comparator 22 includes an inverting input terminal connected to the connection between the inductor L1 and the resistance 7; a non-inverting input terminal connected to the connection between the resistance 7 and the output terminal OUT; and an output terminal connected to the set terminal S of the latch circuit 21. The latch circuit 12 outputs a signal So3 via the output terminal Q as the control signal to the gate of the NMOS transistor M3. The signal So3 is input to the reset terminal RB of the latch circuit 21. The suffix "B" in the above-described reference characters indicates "low" or "enable".

The regulation circuit 5 includes an AND circuit 31, a resistance 32, a capacitor 33, a differential amplifier circuit 34, and a regulation voltage circuit 35 that generates and outputs a settable regulation voltage Vr. The AND circuit 31 includes an input terminal connected to the output terminal Q of the latch circuit 12, another input terminal connected to the output terminal QB of the latch circuit 21, and an output terminal connected to an inverting input terminal of the differential amplifier circuit 34 via the resistance 32.

The capacitor 33 is connected between the inverting input terminal of the differential amplifier circuit 34 and a ground voltage. The resistance 32 and the capacitor 33 function as an integration circuit. The regulation voltage Vr is input to the non-inverting input terminal of the differential amplifier circuit 34. The offset voltage circuit 13 generates and outputs the offset voltage Voff according to an output signal So5 from the differential amplifier circuit 34.

In the above-described configuration, the comparator 11, which is for detecting the inductor backflow current, detects whether or not the voltage difference Vsen1 (Rsen×iL) between the first and the second ends of the resistance 7 is the offset voltage Voff. When the voltage difference Vsen1 is the offset voltage Voff, the inductor current iL may be expressed as Voff/Rsen. When the comparator 11 detects that the voltage difference Vsen1 becomes the offset voltage Voff as the indication of the inductor backflow current, the latch circuit 12 turns off the NMOS transistor M3. The NMOS transistor M3 is kept off until the PWM control circuit 2 outputs the signal So2 to turn on the switching transistor M1.

In the forward current detection circuit 4, an output signal from the comparator 22 rises to high when the voltage at the connection between the output terminal OUT and the resistance 7 rises above the voltage at the first terminal of the resistance 7. The output signal from the comparator 22 is low when the voltage at the connection between the output terminal OUT and the resistance 7 is not greater than the voltage at the first terminal of the resistance 7.

The latch circuit 21 determines that no current flows though the M3 parasite diode and shifts the output signal So4 to a low level when the output signal from the comparator 22 rises to high while the NMOS transistor M3 is off.

The output signal So3 from the latch circuit 12 rises to high to turn off the NMOS transistor M3 when an indication of the inductor backflow current is detected. The output signal So4 from the comparator 22 becomes low when the inductor current iL flowing in a forward direction (forward current) decreases to zero. The forward current flows when the inductor L1 discharges electricity. In the regulation circuit 5, the AND circuit 31 generates and outputs a pulse that is at a high level after the output signal So3 rises to high until the output signal So4 becomes low.

The integration circuit including the resistance 32 and the capacitor 33 integrates and smoothes an output signal So6 from the AND circuit 31 and outputs a signal So7 to the differential amplifier circuit 34. The resistance 32 and the capacitor 33 have a sufficient time constant and the voltage of the signal So7 decreases as a pulse width of the signal So6 decreases.

The differential amplifier circuit 34 regulates the offset voltage Voff generated in the offset voltage circuit 13 so as to set the voltage of the output signal So7 to the regulation voltage Vr. By regulating the offset voltage Voff, the time period from when an indication of the inductor backflow current is detected and the NMOS transistor M3 is turned off until the current flowing through the M3 parasite diode decreases to zero can be regulated. For example, the time of the current flowing through the M3 parasite diode can be set with the regulation voltage Vr regardless of variability in the offset voltage Voff and/or the delay time of the comparator 11.

Figure 5:
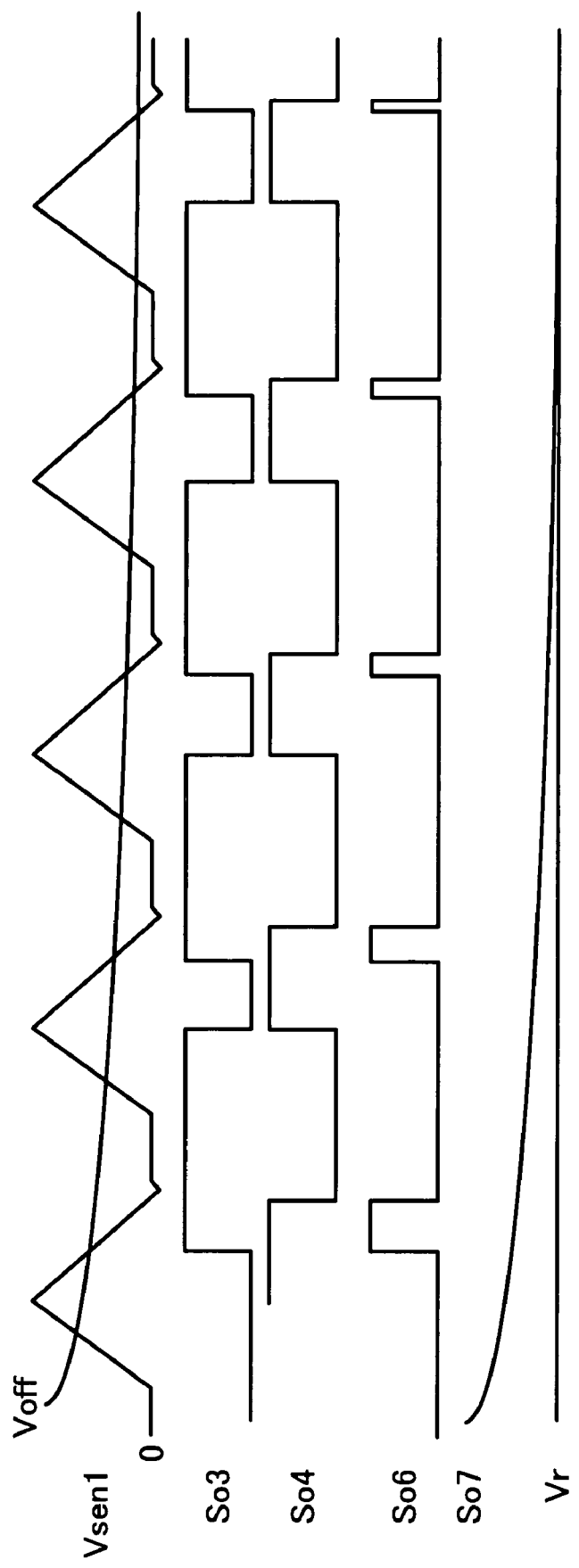
FIG. 5 is a timing chart illustrating wave patterns of respective parts shown in FIG. 4.

FIG. 5 is a timing chart illustrating example wave patterns of respective parts shown in FIG. 4. A sequence of operations by the switching regulator 1 is described with reference to FIGS. 4 and 5.

The inductor current iL is hereinafter regarded as a mean current to activate the backflow detection circuit 3. The regulation circuit 5 regulates the offset voltage Voff to regulate the timing to activate the backflow detection circuit 3.

When the switching transistor M1 is turned off, the voltage Vsen1 decreases to the offset voltage Voff or lower, which is an indication of inductor backflow current. The backflow detection circuit 3 turns off the NMOS transistor M3, detecting the indication of the inductor backflow current. When the voltage Vsen1 decreases to zero, the forward current detection circuit 4 determines that the current flowing through the M3 parasite diode decreases to zero, that is, the forward current is zero and shifts the output signal So4 to the low level.

The AND circuit 31 keeps the output signal So6 high to generate the pulse during the time period after the backflow detection circuit 3 detects the indication of the backflow current until the forward current detection circuit 4 determines that the current flowing through the M3 parasite diode is zero. The output signal So6 is integrated by the resistance 32 and the capacitor 33 and converted into the signal So7 whose voltage corresponds to the pulse width of the output signal So6.

When the pulse width of the output signal So6 is larger and the voltage of the signal So7 is greater than the regulation voltage Vr, the differential amplifier circuit 34 causes the offset voltage circuit 13 to lower the offset voltage Voff. When the offset voltage Voff decreases, the pulse width of the output signal So6 decreases until the voltage of the signal So7 decreases to the regulation voltage Vr. By contrast, when the pulse width of the output signal So6 is smaller and the voltage of the signal So7 is lower than the regulation voltage Vr or no pulse of the output signal So6 is generated because the backflow detection circuit 3 fails timely to detect an indication of the backflow current, the regulation circuit 5 causes the offset voltage circuit 13 to increase the offset voltage Voff.

Although the foregoing description is of the step-down switching regulator 1, alternatively a step-up switching regulator may be used.

Figure 6:
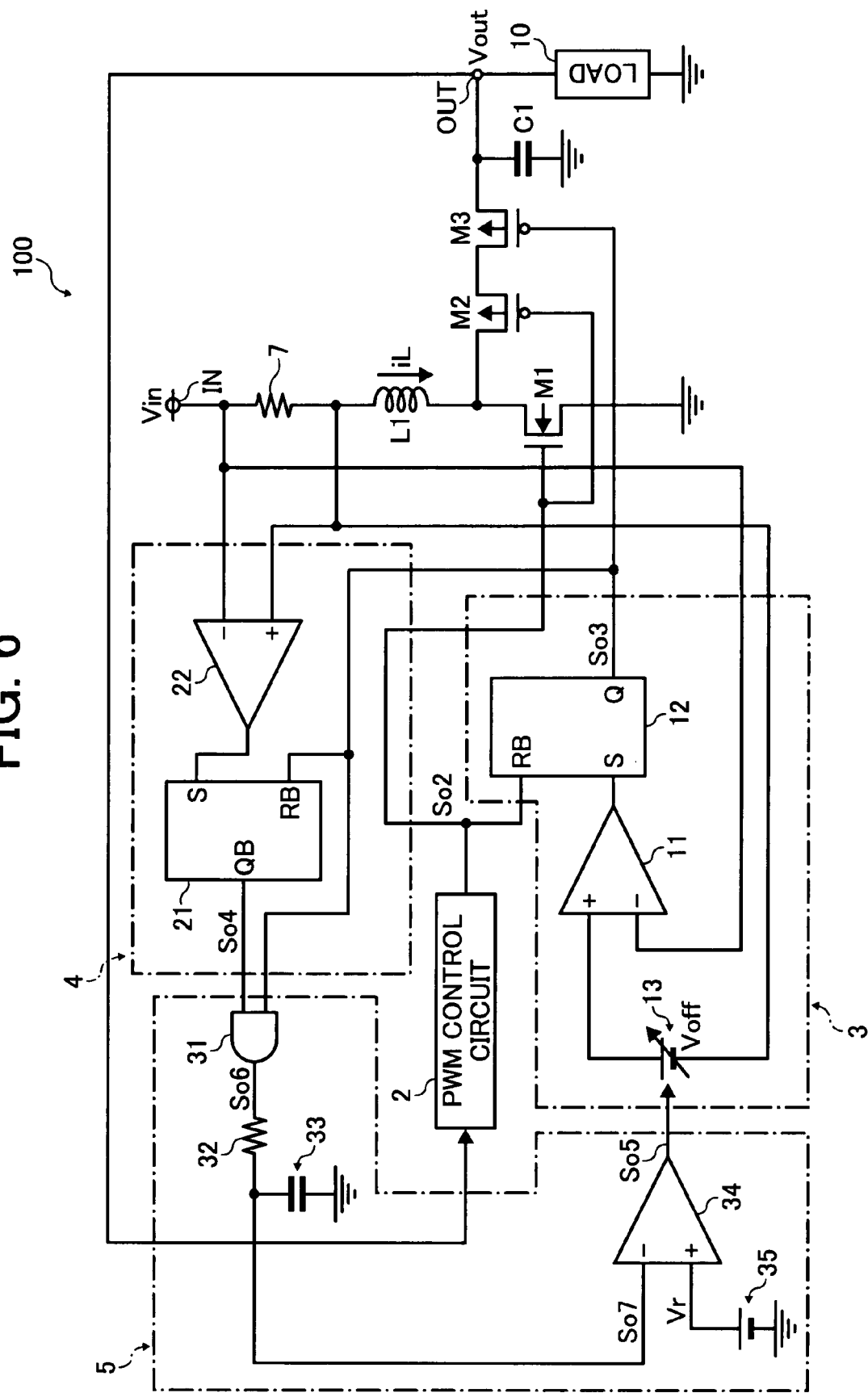
FIG. 6 illustrates a configuration example of a switching regulator according to an example embodiment.

FIG. 6 illustrates a configuration of a step-up switching regulator 100 according to an example embodiment. In FIG. 6, each component that is identical or similar to each component shown in FIG. 4 is indicated by the same reference numeral and redundant description thereof is omitted. Accordingly, the switching regulator 100 includes a PWM control circuit 2, a backflow detection circuit 3, a forward current detection circuit 4, and a regulation circuit 5, each configured similarly to the corresponding part shown in FIG. 4, and the description thereof omitted.

As described above, in the switching regulators 1 or 100, the NMOS transistor M3 is turned off when an indication of the inductor backflow current is detected based on the voltages at both ends of the resistance 7. Further, the timing when the current flowing through the M3 parasite diode is zero is also detectable based on the voltages at both ends of the resistance 7. The switching regulator 1 or 100 is configured to regulate the timing to turn off the NMOS transistor M3 by monitoring when the NMOS transistor M3 is turned off and the current flowing through the M3 parasite diode decreases to zero. Therefore, backflow of the inductor current can be prevented and the time for the current to flow though the M3 parasite diode can be reduced.

Figure 7:
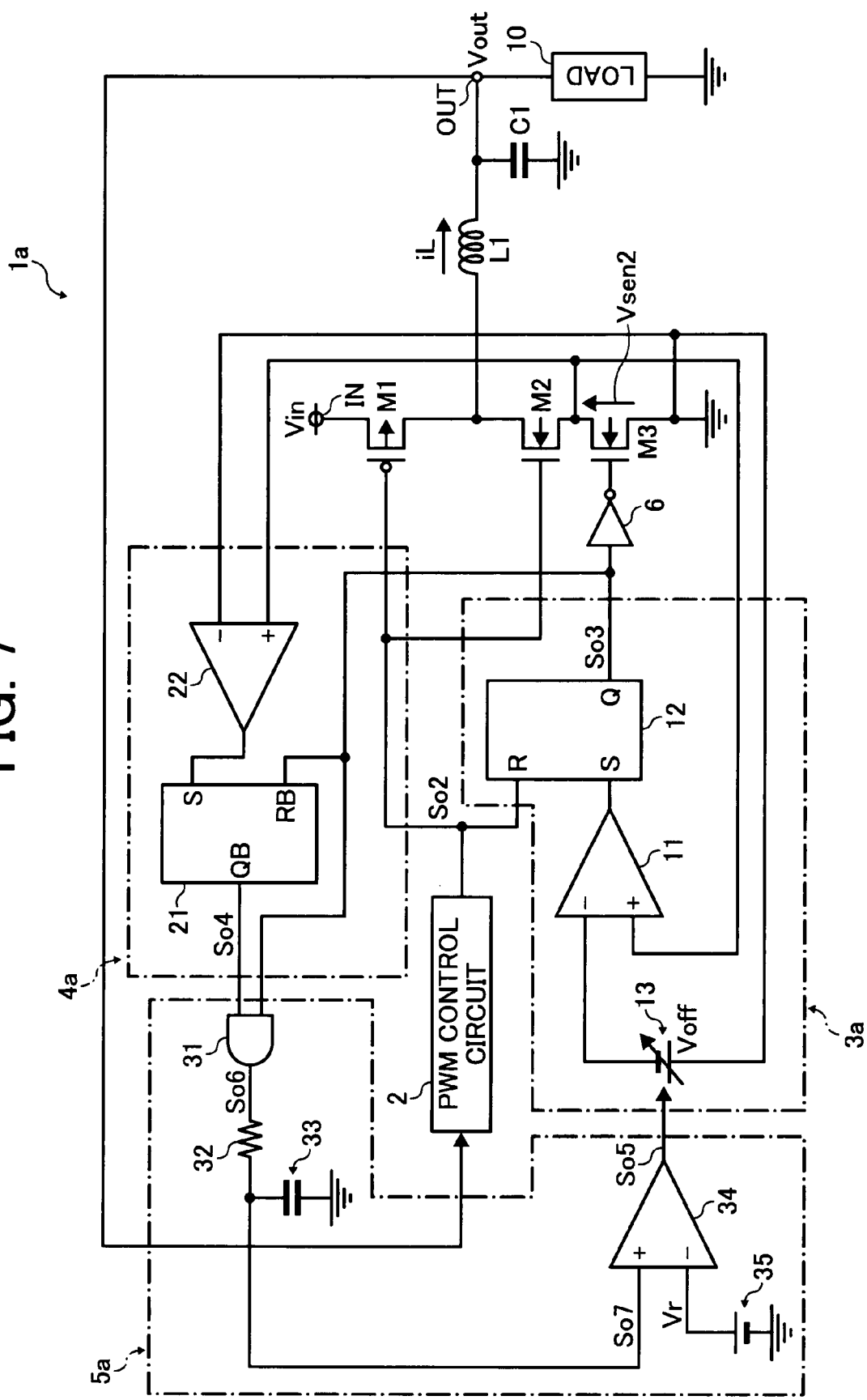
FIG. 7 illustrates a configuration example of a switching regulator according to an example embodiment.

In the above-described embodiment, the resistance 7 for converting the inductor current into a voltage is connected between the inductor L1 and the output terminal OUT to detect the inductor current iL based on the voltages at both ends of the resistance 7. Alternatively, the inductor current iL may be detected based on the voltages at both ends of the NMOS transistor M3 as in a switching regulator 1a illustrated in FIG. 7. In FIG. 7, each component that is identical or similar to each component shown in FIG. 4 is indicated by the same reference numeral and the description thereof omitted.

In FIG. 7, the switching regulator 1a is a synchronous rectification switching regulator that steps down an input voltage Vin input to an input terminal IN to a predetermined or desirable constant voltage and outputs an output voltage Vout from an output terminal OUT to a load 10. The switching regulator 1a includes a switching transistor M1, a synchronous rectification transistor M2, a PWM control circuit 2, a backflow detection circuit 3a, a forward current detection circuit 4a, a regulation circuit 5a, an inverter 6, an NMOS transistor M3, a capacitor C1, and an inductor L1, each configured similarly to the corresponding part shown in FIG. 4.

The backflow detection circuit 3a, the forward current detection circuit 4a, the regulation circuit 5a, the inverter 6, and the NMOS transistor M3 function as a backflow prevention part. The backflow detection circuit 3a and the inverter 6 function as a backflow current detection circuit. The forward current detection circuit 4a and the regulation circuit 5a function as a regulation circuit. The respective circuits in the switching regulator 1a excepting the inductor L1 and the capacitor C1 may be integrated in an IC. Alternatively, at least one of the switching transistor M1 and the synchronous rectification transistor M2 and other circuits excepting the inductor L1 and the capacitor C1 may be integrated in an IC.

Differences in features of the switching regulator 1a from the switching regulator 1 shown in FIG. 4 are as follows: The switching regulator 1a does not include a resistance 7 between the inductor L1 and an output terminal OUT. A non-inverting input terminal of each of comparators 11 and 22 is connected to a connection between the synchronous rectification transistor M2 and the NMOS transistor M3. An offset voltage circuit 13 is connected between an inverting input terminal of the comparator 11 and a ground voltage. An inverting input terminal of the comparator 22 is connected to a ground voltage. A signal So7 that is converted from an output signal So6 sent from an AND circuit 31 is input to a non-inverting input terminal of a differential amplifier 34. A regulation voltage Vr is input to an inverting input terminal of the differential amplifier circuit 34.

The backflow detection circuit 3a detects a backflow of an inductor current iL flowing through the inductor L1 based on the voltages at a first and a second ends of the NMOS transistor M3, and turns off the NMOS transistor M3 to enter a blocked state when detecting an indication of the backflow.

The forward current detection circuit 4a detects, based on the voltages at the first and the second terminals of the NMOS transistor M3, that electric current flowing through a parasite diode of the NMOS transistor M3 (M3 parasite diode) is zero while the NMOS transistor M3 is off. The forward current detection circuit 4a outputs a signal So4 indicating a detection result.

The backflow detection circuit 3a includes the comparator 11, a latch circuit 12, and an offset voltage circuit 13. The offset voltage circuit 13 outputs an offset voltage Voff to the inverting input terminal of the comparator 11. To the non-inverting input terminal of the comparator circuit 11, a voltage at a connection between the synchronous rectification transistor M2 and the NMOS transistor M3 is input.

The latch circuit 12 outputs an output signal So3. The output signal So3 rises to high to turn off the NMOS transistor M3 when an indication of an inductor backflow current is detected. The latch circuit 12 includes a set terminal S connected to an output terminal of the comparator 11, a reset terminal R, and an output terminal Q that is connected to a gate of the NMOS transistor M3 via the inverter 6. The PWM control circuit 2 outputs a signal So2 to a gate of each of the switching transistor M1 and the synchronous rectification transistor M2. The signal So2 is also input to the reset terminal R of the latch circuit 12.

The forward current detection circuit 4a includes a latch circuit 21 and the comparator 22. The latch circuit 21 includes an output terminal QB, a set terminal S connected to an output terminal of the comparator 22, and a reset terminal RB to which the signal So3 from the latch circuit 12 is input. The non-inverting input terminal of the comparator 22 is connected to the connection between the synchronous rectification transistor M2 and the NMOS transistor M3. To the inverting input terminal of the comparator 22, a ground voltage is input.

In the above-described configuration, a drain voltage of the NMOS transistor M3 depends on the inductor current iL, an on resistance of the NMOS transistor M3 that is referred to as a resistance ONR, and characteristics of the M3 parasite diode. The drain voltage of the NMOS transistor M3 is hereinafter referred to as a voltage Vsen2.

In the backflow detection circuit 3a, the comparator 11, which is for detecting an indication of backflow of the inductor current iL, detects that the voltage Vsen2 becomes the offset voltage Voff or greater. A current value detected when the voltage Vsen2 is the offset voltage Voff or greater may be expressed as Voff/ONR. The latch circuit 12 keeps the NMOS transistor M3 off by shifting the output signal So3 to high during a time period extending from after an indication of the inductor backflow current is detected and an output signal from the comparator 11 rises to high until the PWM control circuit 2 turns on the switching transistor M3.

In the forward current detection circuit 4a, the comparator 22 binarizes the voltage Vsen2. An output signal from the comparator 22 is at a high level when the voltage Vsen2 is above the ground voltage and at a low level when the voltage Vsen2 is the ground voltage or lower. The latch circuit 21 determines that the current flowing through the M3 parasite diode is zero and shifts the output signal So4 to low when the output signal from the comparator 22 rises to high while the NMOS transistor M3 is off.

The regulation circuit 5a may include an AND circuit 31, a resistance 32, a capacitor 33, a differential amplifier circuit 34, and a regulation voltage circuit 35. The AND circuit 31 generates and outputs a pulse that becomes high during a time period from when an output signal So3 from the latch circuit 12 becomes high so as to turn off the NMOS transistor M3 until the inductor current iL flowing in a forward direction decreases to zero and the output signal So4 from the latch circuit 21 shifts to low. The resistance 32 and the capacitor 33 form an integration circuit that integrates and smoothes a voltage output from the AND circuit 31. The resistance 32 and the capacitor 33 have a sufficient time constant and a voltage output from the integration circuit decreases as a pulse width of the signal So6 from the AND circuit 31 decrease.

The differential amplifier circuit 34 regulates the offset voltage Voff generated in the offset voltage circuit 13 so as to set the voltage of the output signal So7 to the regulation voltage Vr. By regulating the offset voltage Voff, the time period from when the NMOS transistor M3 is turned off at an indication of the inductor backflow current until the current flowing through the M3 parasite diode is zero can be regulated. For example, a time for the current to flow in the M3 parasite diode can be set with the regulation voltage Vr regardless of variability in the offset voltage Voff and/or the delay time of the comparator 11.

Figure 8:
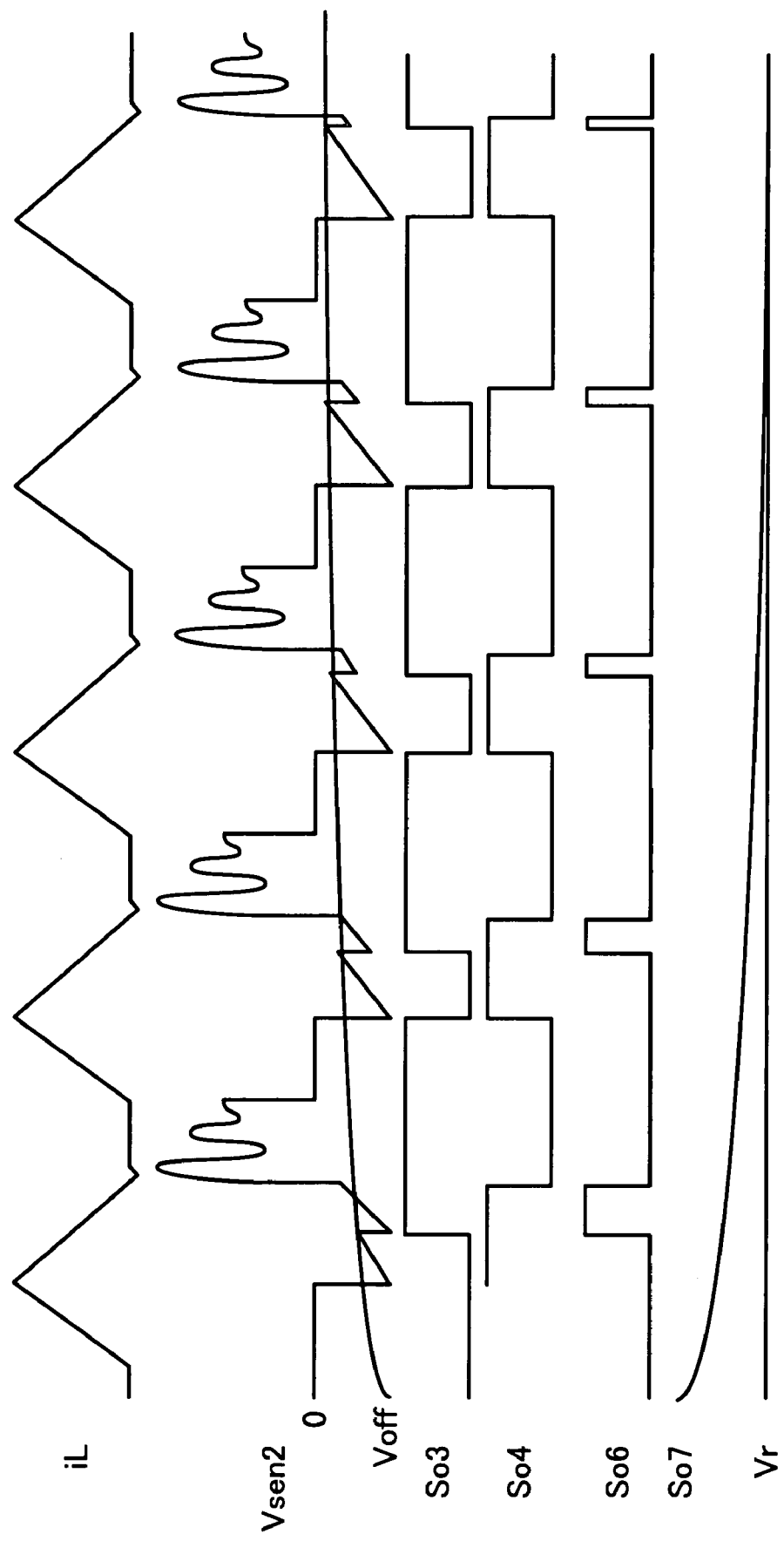
FIG. 8 is a timing chart illustrating wave patterns of respective parts shown in FIG. 7.

A sequence of operations performed by the switching regulator 1a is described with reference to FIGS. 7 and 8. FIG. 8 is a timing chart illustrating example wave patterns of respective parts shown in FIG. 7. The inductor current iL is hereinafter regarded as a mean current to activate the backflow detection circuit 3a. The regulation circuit 5a regulates the offset voltage Voff to regulate the timing to activate the backflow detection circuit 3a.

When the switching transistor M1 is turned off and the voltage Vsen2 increases to the offset voltage Voff or more, which is an indication of an inductor backflow current, the backflow detection circuit 3a detects the indication and turns off the NMOS transistor M3. When the voltage Vsen2 is zero, the forward current detection circuit 4a determines that the current flowing through the M3 parasite diode is zero and shifts the output signal So4 to the low level.

The AND circuit 31 keeps the output signal So6 high to generate the pulse during the time period after the backflow detection circuit 3a detects an indication of the backflow current until the forward current detection circuit 4a determines that the current flowing through the M3 parasite diode is zero. The output signal So6 is integrated by the resistance 32 and the capacitor 33 and converted into the signal So7 whose voltage corresponds to the pulse width of the output signal So6.

When the pulse width of the output signal So6 is larger and the voltage of the signal So7 is greater than the regulation voltage Vr, the differential amplifier circuit 34 causes the offset voltage circuit 13 to increase the offset voltage Voff. When the offset voltage Voff increases, the pulse width of the output signal So6 decreases until the voltage of the signal So7 is equal or close to the regulation voltage Vr. By contrast, when the pulse width of the output signal So6 is smaller and the voltage of the signal So7 is lower than the regulation voltage Vr or no pulse of the output signal So6 is generated because the backflow detection circuit 3 fails timely to detect an indication of the backflow current, the regulation circuit 5a causes the offset voltage circuit 13 to decrease the offset voltage Voff.

Figure 9:
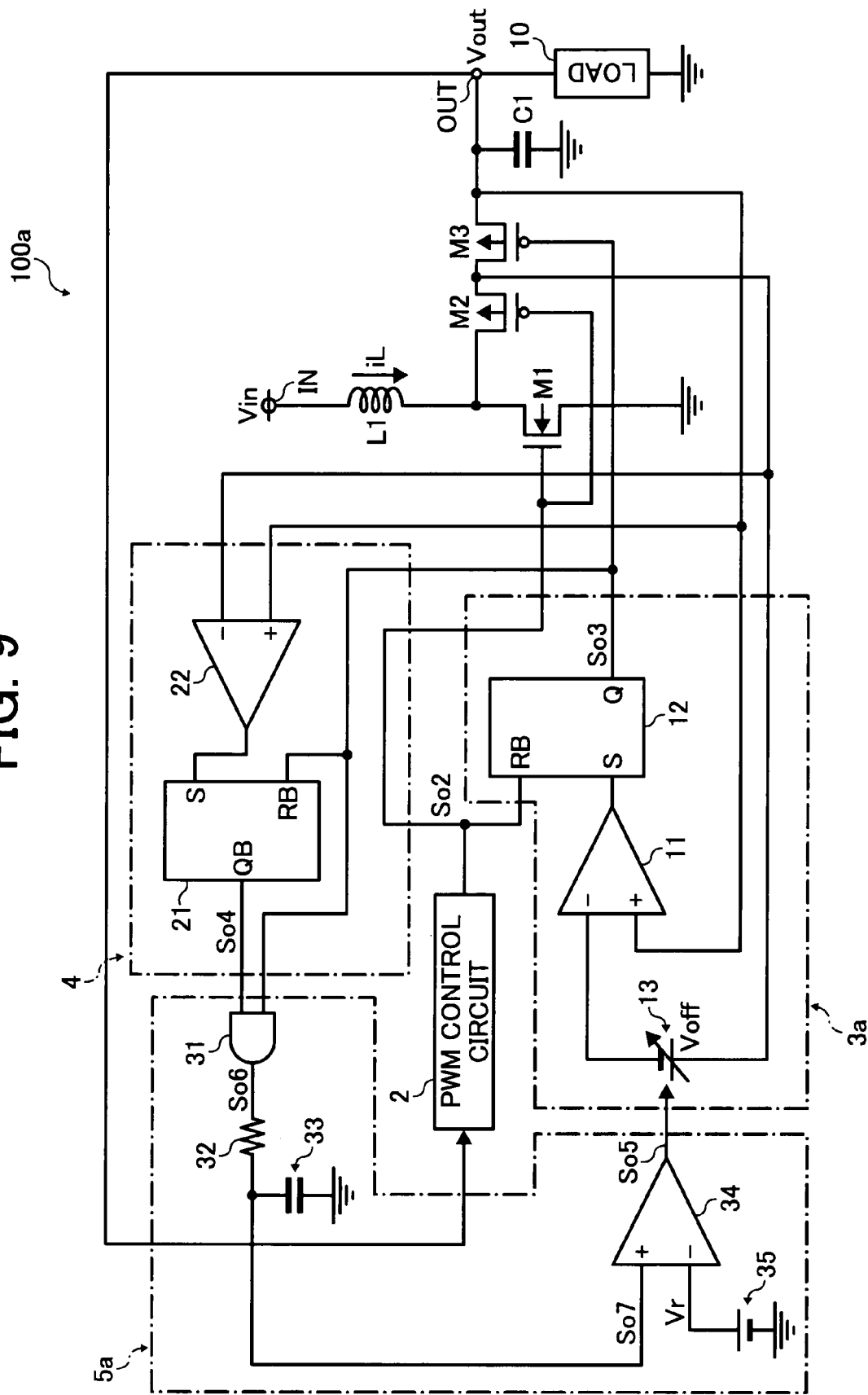
FIG. 9 illustrates a configuration example of a switching regulator according to an example embodiment.

Although the switching regulator 1a may be a step-down switching regulator as described above, alternatively, a step-up switching regulator 100a as illustrated in FIG. 9 may be used.

In FIG. 9, each component that is identical or similar to each component shown in FIG. 7 is given the same reference numeral. The switching regulator 100a includes a PWM control circuit 2, a backflow detection circuit 3a, a forward current detection circuit 4a, and a regulation circuit 5a, each configured similarly to the corresponding part shown in FIG. 4, and a description thereof omitted.

As described above, in the switching regulators 1a or 100a, the NMOS transistor M3 is turned off when an indication of the inductor backflow current is detected based on the drain voltage of the NMOS transistor M3. Further, the timing with which the current flowing through the M3 parasite diode becomes zero, the current starts to flow in reverse, is also detectable based on the drain voltage of the NMOS transistor M3. The switching regulators 1a or 100a is configured to regulate the timing to turn off the NMOS transistor M3 by monitoring when the NMOS transistor M3 is turned off and the current flowing through the M3 parasite diode decreases to zero.

Therefore, the backflow of the inductor current can be prevented and the time for the current to flow through the M3 parasite diode can be reduced. Further, because a resistance to detect the inductor current iL is not required between the inductor L1 and the output terminal, electricity loss can be reduced and efficiency can be enhanced.

In the above-described embodiment, the timing of the shut off of the NMOS transistor M3 is regulated by controlling the offset voltage generated by the offset voltage circuit 13. Alternatively, such timing may be regulated by regulating a delay time of a delay circuit connected to the output terminal of the comparator 11, as illustrated in FIG. 10.

Figure 10:
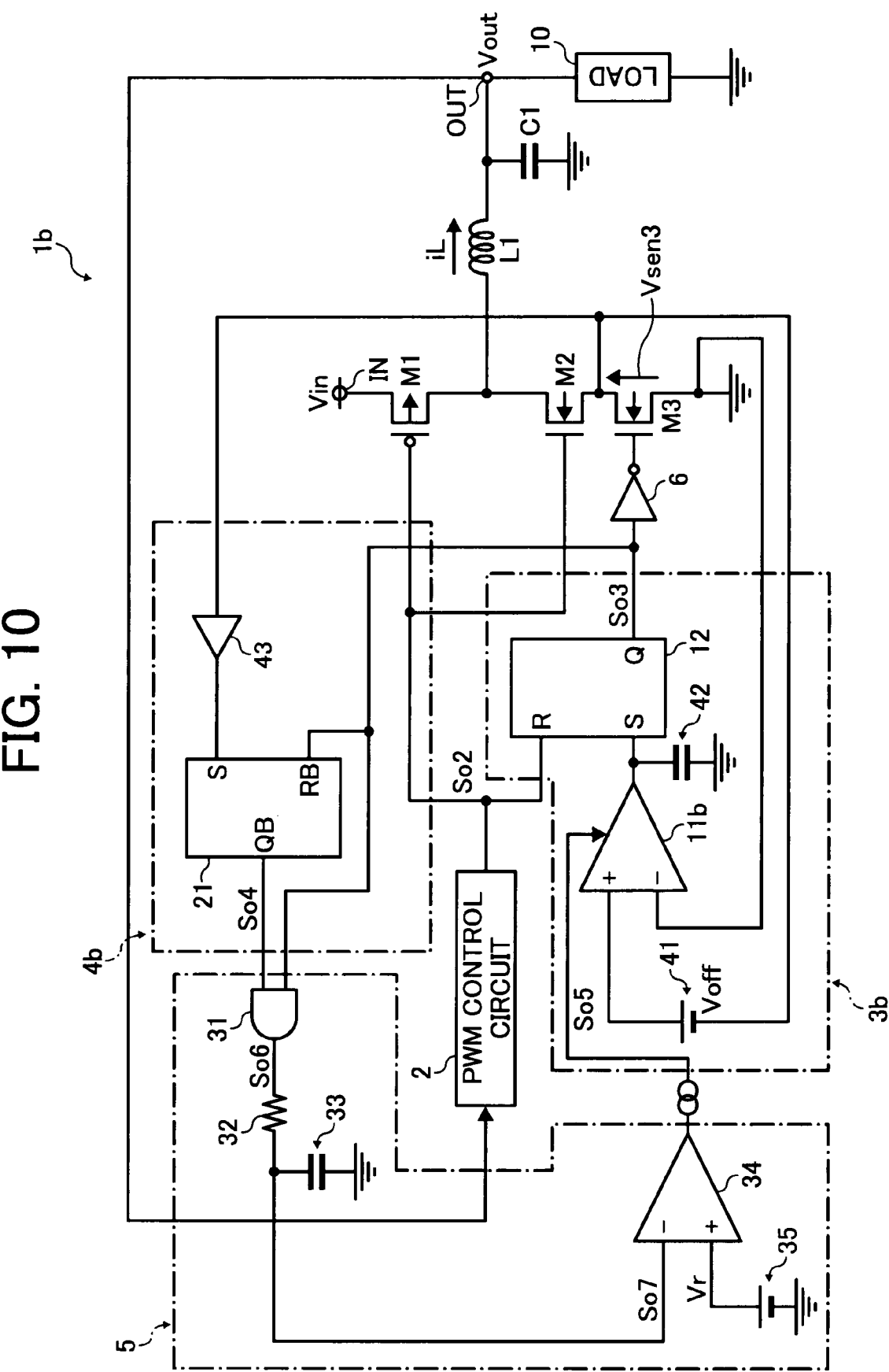
FIG. 10 illustrates a configuration example of a switching regulator according to an example embodiment.

FIG. 10 illustrates a switching regulator 1b according to an example embodiment. In FIG. 10, each component that is identical or similar to each component shown in FIG. 7 is indicated by the same reference numeral and the description thereof omitted.

Differences in features of the switching regulator 1b from the switching regulator 1a shown in FIG. 7 are as follows: The comparator 11 is replaced with a comparator 11b that controls an output current thereof based on a control signal input thereto. In addition, the offset voltage circuit 13 in FIG. 7 is replaced with an offset voltage circuit 41 including a capacitor 42. Moreover, the comparator 22 is replaced with a buffer 43.

In FIG. 10, the switching regulator 1b is a synchronous rectification switching regulator of step down-type. The switching regulator 1b includes a switching transistor M1, a synchronous rectification transistor M2, a PWM control circuit 2, a backflow detection circuit 3b, a forward current detection circuit 4b, a regulation circuit 5, an inverter 6, an NMOS transistor M3, a capacitor C1, and an inductor L1, each configured similarly to the corresponding part shown in FIG. 7.

The backflow detection circuit 3b, the forward current detection circuit 4b, the regulation circuit 5, the inverter 6, and the NMOS transistor M3 function as a backflow prevention part. The backflow detection circuit 3b and the inverter 6 function as a backflow current detection circuit. The forward current detection circuit 4b and the regulation circuit 5 function as a regulation part. The respective circuits in the switching regulator 1b excepting the inductor L1 and the capacitor C1 may be integrated in an IC. Alternatively, at least one of the switching transistor M1 and the synchronous rectification transistor M2 and other circuits excepting the inductor L1 and the capacitor C1 may be integrated in an IC.

The backflow detection circuit 3b detects the backflow of the inductor current iL flowing through the inductor L1 based on the voltages at both ends of the NMOS transistor M3. The NMOS transistor M3 is turned off when an indication of the inductor backflow current is detected. The forward current detection circuit 4b detects that the current flowing through the M3 parasite diode is zero while the NMOS transistor M3 is off based on the drain voltage of the NMOS transistor M3 and outputs a signal indicating the result of the detection.

The backflow detection circuit 3b includes the comparator 11b, a latch circuit 12, the offset voltage circuit 41, and the capacitor 42 that serves as a delay circuit. The comparator 11b and the offset voltage circuit 41 function as a voltage comparison circuit. The forward current detection circuit 4b includes a latch circuit 21 and the buffer 43. The regulation circuit 5 includes an AND circuit 31, a resistance 32, a capacitor 33, a differential amplifier circuit 34, and a regulation voltage circuit 35.

In the backflow detection circuit 3b, a non-inverting input terminal of the comparator 11b is provided with an offset voltage Voff. The non-inverting input terminal of the comparator 11b receives a voltage at a connection between the synchronous rectification-transistor M2 and the NMOS transistor M3 plus the offset voltage. An output terminal of the comparator 11b is connected to a set terminal S of the latch circuit 12 that serves as a drive control circuit. The PWM control circuit 2 outputs an output signal So2 to a gate of each of the switching transistor M1 and the synchronous rectification transistor M2. The output signal So2 is also input to a reset terminal R of the latch circuit 12. The latch circuit 12 outputs a signal So3 from an output terminal Q thereof that is connected to a gate of the NMOS transistor M3 via the inverter 6. The capacitor 42 is connected between the output terminal of the comparator 11b and a ground voltage. The comparator 11b outputs a current according to a voltage of an output signal So5 from a differential amplifier circuit 34.

In the forward current detection circuit 4b, the buffer 43 includes an input terminal connected to the connection between the synchronous rectification transistor M2 and the NMOS transistor M3 and an output terminal connected to a set terminal S of the latch circuit 21. The output signal So3 from the latch circuit 12 is input to a reset terminal RB of the latch circuit 21.

In the above-described configuration, a drain voltage of the NMOS transistor M3 depends on the inductor current iL, an ON resistance of the NMOS transistor M3 (resistance ONR), and characteristics of the parasite diode of the NMOS transistor M3. The drain voltage of the NMOS transistor M3 is hereinafter referred to as a voltage Vsen3.

In the backflow detection circuit 3b, the comparator 11b, detects that the voltage Vsen3 becomes equal to or greater than the offset voltage Voff as an indication that an inductor current iL is about to flow in reverse. A current value detected when the voltage Vsen3 is equal to the offset voltage Voff is expressed by Voff/ONR. When an indication of the inductor backflow current is detected and an output signal from the comparator 11b rises to high, the capacitor 42 is charged with the current output from the comparator 11b. After the capacitor 42 is charged, the set terminal S of the latch circuit 12 rises to high. The time required to charge the capacitor 42 is a delay time to the output signal from the comparator 11b. The latch circuit 12 keeps the NMOS transistor M3 off until the PWM control circuit 2 turns on the switching transistor M1.

In the forward current detection circuit 4b, the buffer 43 amplifies LCR oscillation of the voltage Vsen3. When the voltage Vsen3 exceeds a threshold voltage value of the buffer 43, an output signal from the buffer 43 becomes high. When the voltage Vsen3 is not greater than the threshold voltage value of the buffer 43, the output signal from the buffer 43 is low. The latch circuit 21 determines that the current flowing in the M3 parasite diode is zero and shifts an output signal So4 to a low level when the output signal from the buffer 43 becomes high while the NMOS transistor M3 is off.

The resistance 32 and the capacitor 33 function as an integration circuit that outputs an output signal So7. The differential amplifier circuit 34 regulates the output current from the comparator 11b so as to set the voltage of the output signal So7 to be equal or close to the regulation voltage Vr. The differential amplifier circuit 34 regulates the delay time to the output signal from the comparator 11b by regulating the voltage of the output signal So7 as described above. Thus, the switching regulator 1b can regulate the time period from when the NMOS transistor M3 is turned off until when the current flowing through the M3 parasite diode is zero. Therefore, the time period for the current to flow in the M3 parasite diode can be set with the regulation voltage Vr regardless of variability in the offset voltage Voff and/or the delay time of the comparator 11b.

Figure 11:
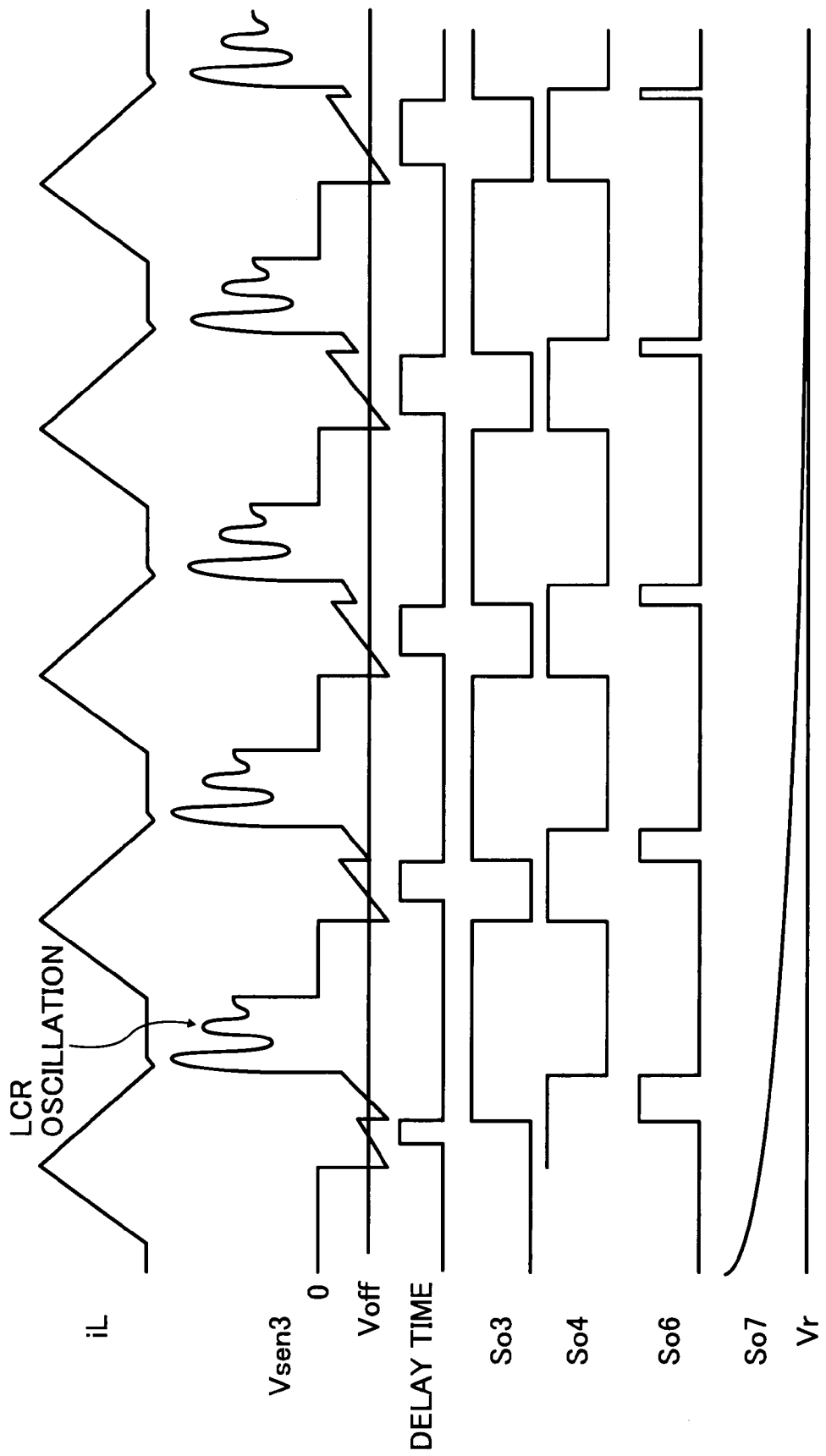
FIG. 11 is a timing chart illustrating wave patterns of respective parts shown in FIG. 10.

A sequence of operations performed by the switching regulator 1b is described with reference to a timing chart shown in FIGS. 10 and 11. FIG. 11 is example wave patterns of respective parts shown in FIG. 10.

When the voltage Vsen3 becomes equal to or greater than the offset voltage Voff, that is, the inductor current iL shows an indication of backflow, the comparator 11b raises the output signal to high. The set terminal of the latch circuit 12 becomes high after the delay time that is determined by the output current from the comparator 11b and the capacity of the capacitor 42. Therefore, the NMOS transistor M3 is turned off after the delay time since the output signal from the comparator 11b becomes high.

When the current flowing through the M3 parasite diode is zero, the voltage Vsen3 starts LCR oscillation. The buffer 43 amplifies the voltage Vsen3. The output signal So4 from the latch circuit 21 becomes low. The AND circuit 31 keeps the output signal So6 high to generate a pulse during the time period extending from after the NMOS transistor M3 is turned off until the forward current detection circuit 4b determines that the current flowing through the M3 parasite diode is zero. The output signal So6 is integrated by the resistance 32 and the capacitor 33 and converted into the signal So7 whose voltage corresponds to the pulse width of the output signal So6.

When the pulse width of the output signal So6 is larger and the voltage of the signal So7 is greater than the regulation voltage Vr, the delay time due to the capacitor 42 is increased. To increase the delay time, the differential amplifier circuit 34 causes the comparator 11b to reduce the output current thereof. Thus, the voltage of the signal So7 is decreased to the regulation voltage Vr.

By contrast, when the pulse width of the output signal So6 is smaller and the voltage of the signal So7 is lower than the regulation voltage Vr or no pulse of the output signal So6 is generated because the backflow detection circuit 3b fails timely to detect an indication of the backflow current, the output current from the comparator 11b is increased and thus, the delay time is decreased.

The switching regulator 1b may be a step-down switching regulator as in the above description. Alternatively, a step-up switching regulator 100b as illustrated in FIG. 12 may be used.

Figure 12:
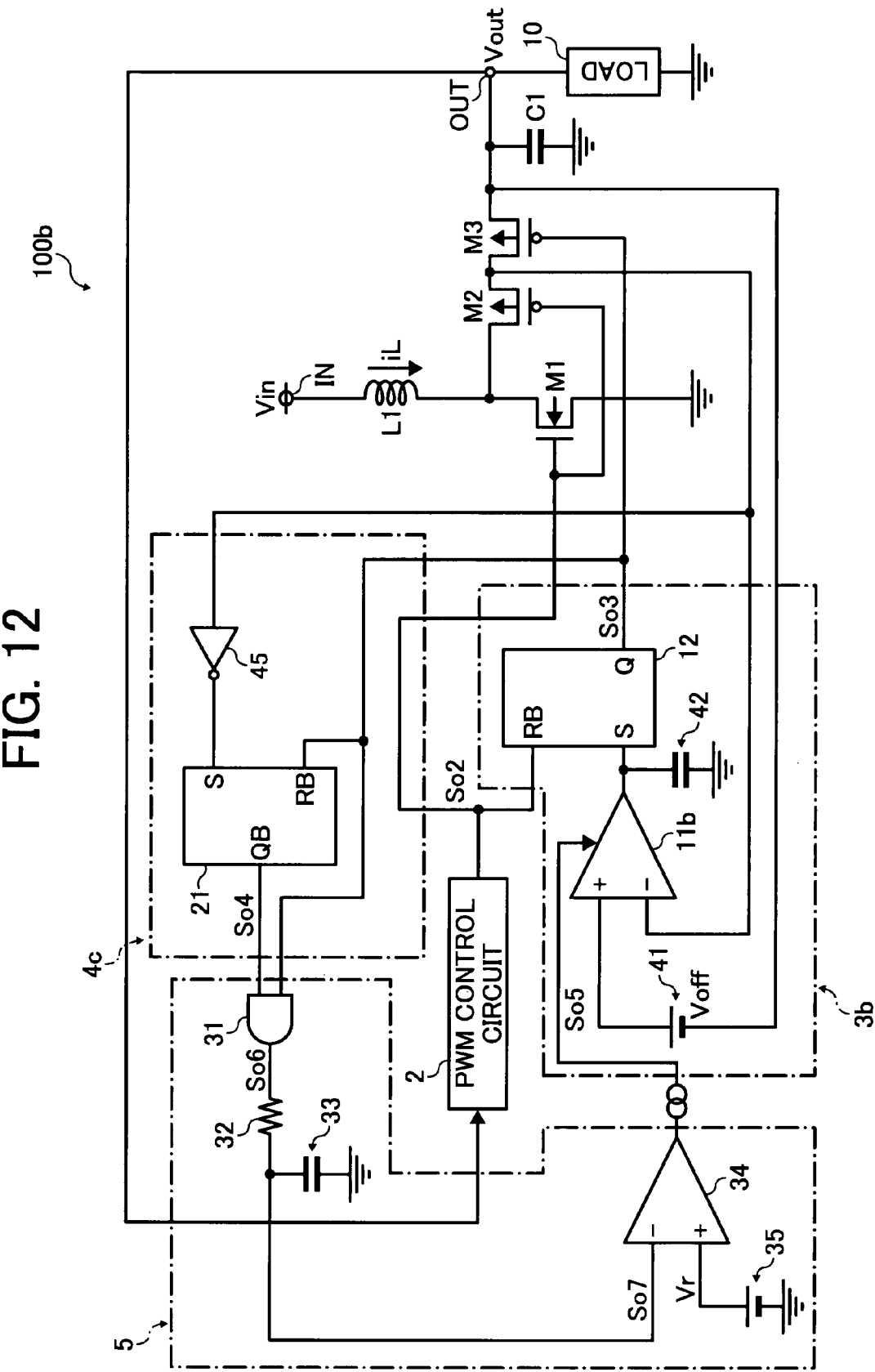
FIG. 12 illustrates a configuration example of a switching regulator according to an example embodiment.

In FIG. 12, each component that is identical or similar to each component shown in FIG. 10 is indicated by the same reference numeral. The switching regulator 100b includes a PWM control circuit 2, a backflow detection circuit 3b, a forward current detection circuit 4c, and a regulation circuit 5. The forward current detection circuit 4c includes an inverter 45 instead of the buffer 43 shown in FIG. 10. In other respects, each part of the switching regulator 100b is configured similarly to the corresponding part shown in FIG. 10 and the description thereof omitted.

As described above, in the switching regulators 1b or 100b, the NMOS transistor M3 is turned off when an indication of the inductor backflow current is detected based on the drain voltages of the NMOS transistor M3. Further, the timing with which the current flowing through the M3 parasite diode becomes zero, at which the current starts to flow in reverse, is also detectable based on the drain voltage of the NMOS transistor M3. The timing of the turning off of the NMOS transistor M3 can be regulated by monitoring when the NMOS transistor M3 is turned off and the current flowing through the M3 parasite diode decreases to zero and regulating the delay time due to the capacitor 42. The delay time can be regulated by regulating the output current from the comparator 11b. Therefore, the backflow of the inductor current can be prevented and the time the current flows in the M3 parasite diode can be reduced. Further, the circuit can be downsized and electric consumption can be reduced by using a buffer or an inverter instead of the comparator.

Figure 13:
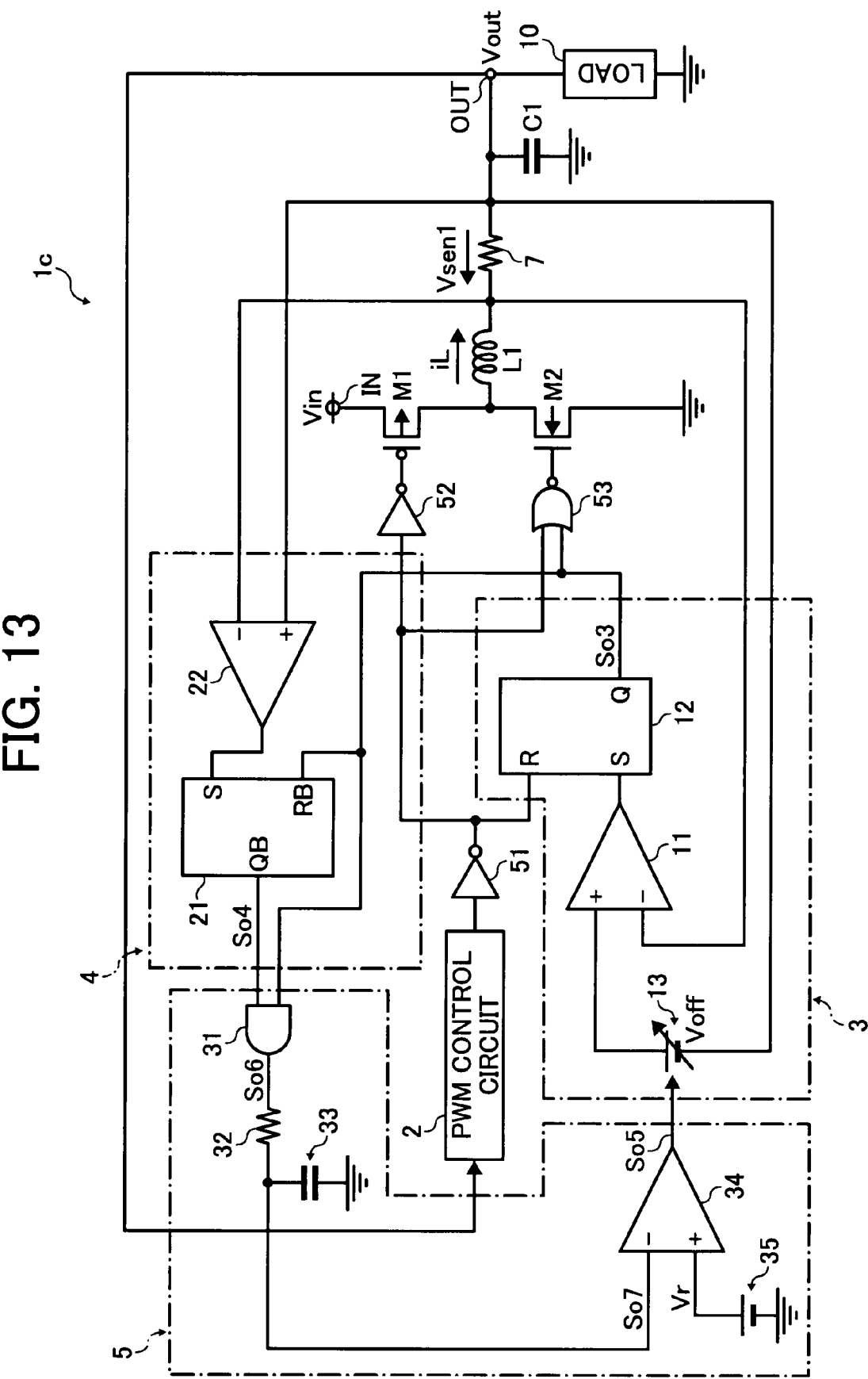
FIG. 13 illustrates a configuration example of a switching regulator according to an example embodiment.
Figure 14:
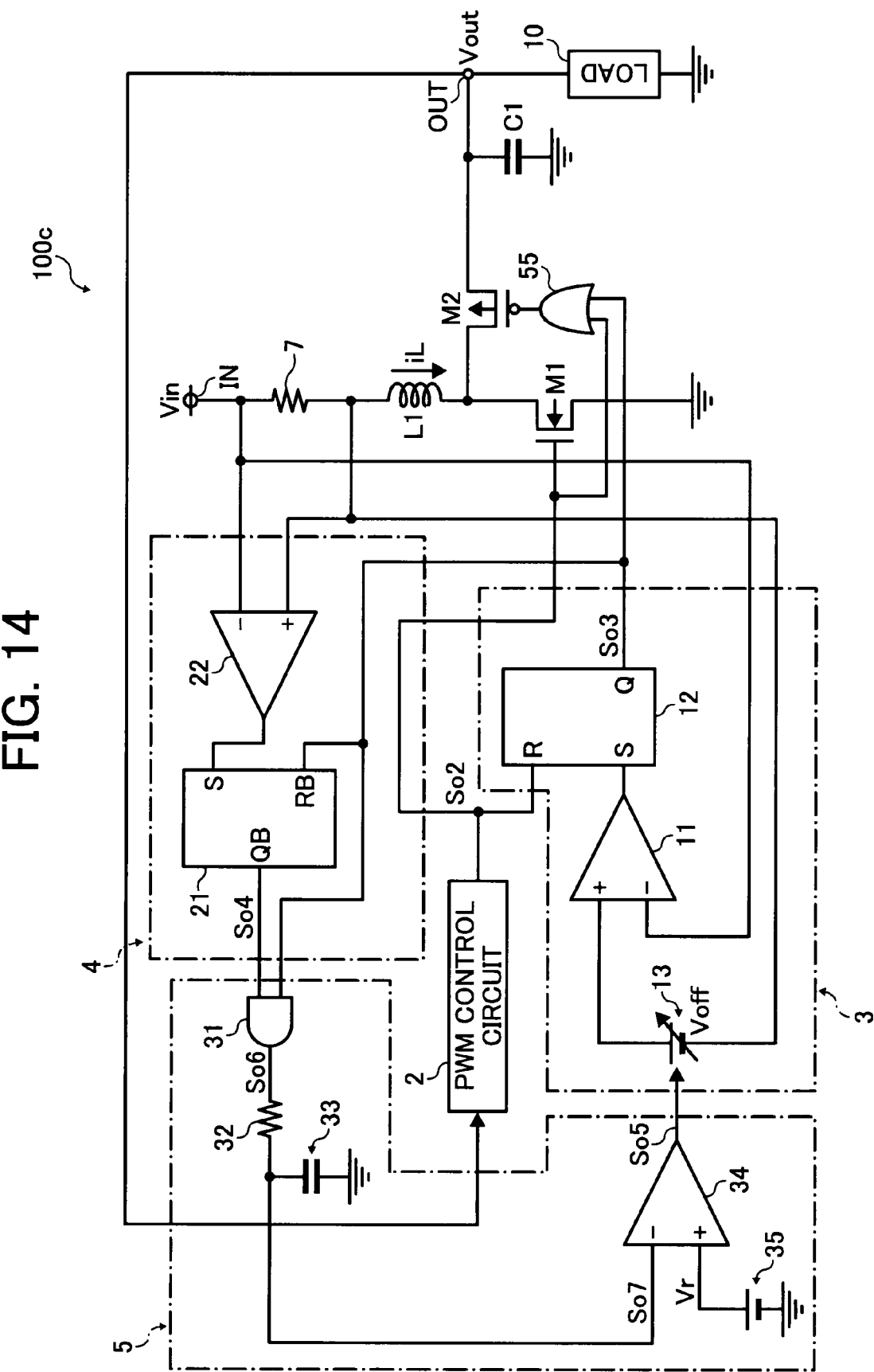
FIG. 14 illustrates a configuration example of a switching regulator according to an example embodiment.

As described above, the switching regulator according to an embodiment includes a backflow prevention transistor M3. Alternatively, the synchronous rectification transistor M2 may also serve as the backflow prevention transistor M3. In this case, the switching regulator 1 shown in FIG. 4 is configured to be like a switching regulator 1c illustrated in FIG. 13. Unlike the switching regulator 1 shown in FIG. 4, the switching regulator 1c includes an inverter 52 and a NOR circuit 53 and does not include the NMOS transistor M3 and the inverter 6. Similarly, the switching regulator 100 shown in FIG. 6 is configured to be like a switching regulator 100c illustrated in FIG. 14. Unlike the switching regulator 100 shown in FIG. 6, the switching regulator 100c includes an OR circuit 55 and does not include the NMOS transistor M3. In FIGS. 13 and 14, each component that is identical or similar to each component shown in FIGS. 13 and 14, respectively, is indicated by the same reference numeral and the description thereof omitted.

In the case of the switching regulator 1a shown in FIG. 7 and the switching regulator 100a shown in FIG. 9, the current that flows when the inductor L1 is discharged is detected based on the voltages at both ends of the NMOS transistor M3. Alternatively, the current may be detected based on the both ends of the synchronous rectification transistor M2. Further, the comparator constituting the backflow detection circuit may be configured to include an offset voltage.

Numerous additional modifications and variations are possible in light of the above teachings. It is therefore to be understood that, within the scope of the appended claims, the disclosure of this patent specification may be practiced otherwise than as specifically described herein.

What is claimed is:

1. A control circuit for a synchronous rectification switching regulator including:
an output terminal configured to output a constant voltage to a load connected thereto;
a switching transistor configured to perform switching according to a control signal;

an inductor configured to be charged with an input voltage by the switching of the switching transistor; and a synchronous rectification transistor configured to perform switching according to a control signal to discharge the inductor, the control circuit comprising:

a control part configured to control the switching of the switching transistor to set the voltage output from the output terminal to a predetermined voltage and cause the synchronous rectification transistor to switch reversely to the switching of the switching transistor; and a backflow prevention part configured to block a current flowing in the synchronous rectification transistor to prevent a backflow current flowing in a direction from the output terminal to the synchronous rectification transistor, wherein the backflow prevention part detects a forward current that flows when the synchronous rectification transistor discharges the inductor and regulates timing to block the current flowing in the synchronous rectification transistor to prevent an occurrence of the backflow current and to regulate a time period from blocking the current flowing in the synchronous rectification transistor to determining that the forward current is zero.

2. The control circuit of claim 1, wherein the backflow prevention part comprises a resistance for detecting an inductor current flowing in the inductor, the resistance configured to convert the inductor current into a voltage; and the forward current and the backflow current are detected based on voltages at both ends of the resistance.

3. The control circuit of claim 2, wherein the backflow prevention part further comprises:

a backflow detection part configured to turn off the synchronous rectification transistor to block the current flowing therein when detecting an indication or an occurrence of the backflow current based on the voltages at both ends of the resistance; and a regulation part configured to detect the forward current based on the voltages at both ends of the resistance and control the backflow detection part to set the timing to turn off the synchronous rectification transistor and set the time period from blocking the current flowing in the synchronous rectification transistor to determining that the forward current is zero to a predetermined time.

4. The control circuit of claim 2, wherein the backflow prevention part further comprises:

a backflow prevention transistor connected in series with the synchronous rectification transistor, configured to switch according to a control signal input to a control electrode thereof;

a backflow detection part configured to turn off the backflow prevention transistor to block the current flowing in the synchronous rectification transistor when detecting an indication or an occurrence of the backflow current based on the voltages at both ends of the resistance; and a regulation part configured to detect the forward current based on the voltages at both ends of the resistance and control the backflow detection part to set the timing to turn off the backflow prevention transistor and set the time period from blocking the current flowing in the synchronous rectification transistor to determining that the forward current is zero to a predetermined time.

5. The control circuit of claim 4, wherein the regulation part is configured to set the predetermined time.

6. The control circuit of claim 4, wherein the backflow detection part further comprises:

a voltage comparison circuit configured to compare the voltages at both ends of the resistance; and a drive control circuit configured to control the switching of the backflow prevention transistor according to a voltage comparison result produced by the voltage comparison circuit, wherein the regulation part controls an offset voltage of the voltage comparison circuit to regulate the timing to turn off the synchronous rectification transistor.

7. The control circuit of claim 1, wherein the backflow prevention part comprises:

a backflow prevention transistor connected in series with the synchronous rectification transistor, configured to perform switching according to a control signal input to a control electrode thereof;

a backflow detection part configured to turn off the backflow prevention transistor to block the current flowing in the synchronous rectification transistor when detecting an indication or an occurrence of the backflow current based on voltages at both ends of the backflow prevention transistor; and a regulation part configured to detect the forward current based on the voltages at both ends of the backflow prevention transistor and control the backflow detection part to set the timing to turn off the backflow prevention transistor and set the time period from blocking the current flowing in the synchronous rectification transistor to determining that the forward current is zero to a predetermined time.

8. The control circuit of claim 7 wherein the backflow detection part comprises:

a voltage comparison circuit configured to compare the voltages at both ends of the backflow prevention transistor and to output a signal indicating a result of the voltage comparison;

a delay circuit configured to transmit the signal from the voltage comparison circuit after a delay time;

a drive control circuit configured to control the backflow prevention transistor to switch according to the signal transmitted via the delay circuit, wherein the control part controls the delay time of the delay circuit to regulate the timing to turn off the synchronous rectification transistor.

9. The control circuit of claim 7, wherein the backflow detection part further comprises:

a voltage comparison circuit configured to compare the voltages at both ends of the backflow prevention transistor; and a drive control circuit configured to control the backflow prevention transistor to switch-according to a voltage comparison result produced by the voltage comparison circuit, wherein the regulation part controls an offset voltage of the voltage comparison circuit to regulate the timing to turn off the synchronous rectification transistor.

10. The control circuit of claim 1, wherein the backflow prevention part comprises:

a backflow detection part configured to turn off the synchronous rectification transistor to block the current flowing in the synchronous rectification transistor when detecting an indication or an occurrence of the backflow current based on voltages at both ends of a transistor configured in series with the switching transistor between the input terminal and a ground voltage; and a regulation part configured to detect the forward current based on the voltages at both ends of the transistor configured in series with the switching transistor between the input terminal and a ground voltage and control the backflow detection part to set the timing to turn off the synchronous rectification transistor and set the time period from blocking the current flowing in the synchronous rectification transistor to determining that the forward current is zero to a predetermined time.

11. The control circuit of claim 10, wherein the backflow detection part comprises:
a voltage comparison circuit configured to compare the voltages at both ends of the synchronous rectification transistor; and
a drive control circuit configured to control the synchronous rectification transistor to switch according to a voltage comparison result produced by the voltage comparison circuit,
wherein the regulation part controls an offset voltage of the voltage comparison circuit to regulate the timing to turn off the synchronous rectification transistor.

12. The control circuit of claim 10 wherein the backflow detection part comprises:
a voltage comparison circuit configured to compare the voltages at both ends of the synchronous rectification transistor and to output a signal indicating a result of the voltage comparison;
delay circuit configured to transmit the signal output from the voltage comparison circuit after a delay time; and
a drive control circuit configured to control the synchronous rectification transistor to switch according to the signal transmitted via the delay circuit,
wherein the control part controls the delay time to regulate the timing to turn off the synchronous rectification transistor.

13. A synchronous rectification switching regulator, comprising:
an output terminal configured to output a constant voltage to a load connected thereto;
a switching transistor configured to perform switching according to a control signal;
an inductor configured to be charged with an input voltage by the switching of the switching transistor;
a synchronous rectification transistor configured to perform switching according to a control signal to discharge the inductor;
a control part configured to control the switching of the switching transistor to set the voltage output from the output terminal to a predetermined voltage and cause the synchronous rectification transistor to switch reversely to the switching transistor; and
a backflow prevention part configured to block a current flowing in the synchronous rectification transistor to prevent a backflow current flowing in a direction from the output terminal to the synchronous rectification transistor,
wherein the backflow prevention part detects a forward current that flows when the synchronous rectification transistor discharges the inductor and regulates timing to block the current flowing in the synchronous rectification transistor to prevent an occurrence of the backflow current and regulate a time period from blocking the current flowing in the synchronous rectification transistor to determining that the forward current is zero.

14. The synchronous rectification switching regulator of claim 13, wherein:
the backflow prevention part comprises a resistance for detecting an inductor current flowing in the inductor, configured to convert the inductor current into a voltage; and
the forward current and the backflow current are detected based on voltages at both ends of the resistance.

15. The synchronous rectification switching regulator of claim 14, wherein the backflow prevention part further comprises:
a backflow detection part configured to turn off the synchronous rectification transistor to block the current flowing therein when detecting an indication or an occurrence of the backflow current based on the voltages at both ends of the resistance; and
a regulation part configured to detect the forward current based on the voltages at both ends of the resistance and control the backflow detection part to set the timing to turn off the synchronous rectification transistor and set the time period from blocking the current flowing in the synchronous rectification transistor to determining that the forward current is zero to a predetermined time.

16. The synchronous rectification switching regulator of claim 14, wherein the backflow prevention part further comprises:
a backflow prevention transistor connected in series with the synchronous rectification transistor, configured to switch according to a control signal input to a control electrode thereof;
a backflow detection part configured to turn off the backflow prevention transistor to block the current flowing in the synchronous rectification transistor when detecting an indication or an occurrence of the backflow current based on the voltages at both ends of the resistance; and
a regulation part configured to detect the forward current based on the voltages at both ends of the resistance and control the backflow detection part to set the timing to turn off the backflow prevention transistor and set the time period from blocking the current flowing in the synchronous rectification transistor to determining that the forward current is zero to a predetermined time.

17. The synchronous rectification switching regulator of claim 16, wherein the regulation part is configured to set the predetermined time.

18. The synchronous rectification switching regulator of claim 13, wherein the backflow prevention part comprises:
a backflow detection part configured to turn off the synchronous rectification transistor to block the current flowing in the synchronous rectification transistor when detecting an indication or an occurrence of the backflow current based on voltages at both ends of a transistor in series with the switching transistor between the input terminal and a ground voltage; and
a regulation part configured to detect the forward current based on the voltages at both ends of the transistor configured in series with the switching transistor between the input terminal and a ground voltage and the backflow detection part to set the timing to turn off the synchronous rectification transistor and set the time period from blocking the current flowing in the synchronous rectification transistor to determining that the forward current is zero to a predetermined time.

19. The synchronous rectification switching regulator of claim 13, wherein the backflow prevention part comprises:
a backflow prevention transistor connected in series with the synchronous rectification transistor, configured to perform switching according to a control signal input to a control electrode thereof;
a backflow detection part configured to turn off the backflow prevention transistor to block the current flowing in the synchronous rectification transistor when detecting an indication or an occurrence of the backflow current based on voltages at both ends of the backflow prevention transistor; and a regulation part configured to detect the forward current based on the voltages at both ends of the backflow prevention transistor and control the backflow detection part to set the timing to turn off the backflow prevention transistor and set the time period from blocking the current flowing in the synchronous rectification transistor to determining that the forward current is zero to a predetermined time.

20. A control method of controlling a synchronous rectification switching regulator having an output terminal configured to output a constant voltage to a load connected thereto, a switching transistor configured to perform switching according to a control signal, an inductor configured to be charged with an input voltage by the switching of the switching transistor, and a synchronous rectification transistor configured to perform switching according to a control signal to discharge the inductor;

the control method, comprising:

controlling the switching of the switching transistor to set the voltage output from the output terminal to a predetermined voltage and causing the synchronous rectification transistor to switch reversely to the switching transistor;

detecting a forward current that flows when the synchronous rectification transistor discharges the inductor;

blocking a current flowing in the synchronous rectification transistor to prevent a backflow current flowing in a direction from the output terminal to the synchronous rectification transistor;

determining that the forward current is zero; and regulating timing to block the current flowing in the synchronous rectification transistor to regulate a time period from blocking the current flowing in the synchronous rectification transistor to determining that the forward current is zero.

* * * * *